(12) United States Patent
Li et al.

(10) Patent No.: US 8,295,158 B2
(45) Date of Patent: Oct. 23, 2012

(54) METHOD OF SESSION PROCESSING IN AN IMS AND INTERROGATING-CALL STATE CONTROL FUNCTION

(75) Inventors: Changlin Li, Shenzhen (CN); Fenqin Zhu, Shenzhen (CN); Jianguo Zhao, Shenzhen (CN); Jing Wang, Shenzhen (CN); Xiaoyan He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 537 days.

(21) Appl. No.: 12/040,571

(22) Filed: Feb. 29, 2008

(65) Prior Publication Data

US 2008/0160996 A1 Jul. 3, 2008

Related U.S. Application Data

(63) Continuation of application No. PCT/CN2006/002244, filed on Aug. 31, 2006.

(30) Foreign Application Priority Data

| | | |
|---|---|---|
| Aug. 31, 2005 | (CN) | 2005 1 0099703 |
| Sep. 5, 2005 | (CN) | 2005 1 0099742 |
| Sep. 26, 2005 | (CN) | 2005 1 0105027 |
| Oct. 21, 2005 | (CN) | 2005 1 0118254 |
| Oct. 21, 2005 | (CN) | 2005 1 0118255 |
| Dec. 14, 2005 | (CN) | 2005 1 0120860 |

(51) Int. Cl.
*H04L 12/26* (2006.01)
(52) U.S. Cl. .................. 370/216; 709/227; 709/239
(58) Field of Classification Search .................. None
See application file for complete search history.

(56) References Cited

U.S. PATENT DOCUMENTS 7,610,619 B2 * 10/2009 Kastelewicz et al. .......... 726/10
(Continued)

FOREIGN PATENT DOCUMENTS

CN 1414775 A 4/2003
(Continued)

OTHER PUBLICATIONS

"3rd Generation Partnership Project; Technical Specification Group Services and Systems Aspects; IP Multimedia Subsystems (IMS); Stage 2(Release 5)," 3GPP TS 23.228 V5.5.0, 1-129 (Jun. 2002).

(Continued)

*Primary Examiner* — Brian Roberts
(74) *Attorney, Agent, or Firm* — Leydig, Voit & Mayer, Ltd.

(57) ABSTRACT

A method of session processing in the Internet Protocol (IP) Multimedia Subsystem (IMS) comprises: Interrogating-Call State Control Function (I-CSCF) accessing the Home Subscriber Server (HSS) to query the registration location of the called user, the I-CSCF sending the Session Initiation Protocol (SIP) request to the Serving-Call State Control Function (S-CSCF) based on the response of the HSS; when the response time of the S-CSCF to the SIP request sent from the I-CSCF has expired, the I-CSCF re-selecting the S-CSCF, and sending the SIP request to the S-CSCF. And an Interrogating-Call State Control Function is provided. According to the present invention, if the S-CSCF returned by the HSS to process the unregistered service of the IMS user does not responded because of the device failure or communication interruption or the like, the I-CSCF can re-select other S-CSCF to process the unregistered service of the IMS user, so as to improve the quality of service and to increase the satisfaction of user.

19 Claims, 6 Drawing Sheets

U.S. PATENT DOCUMENTS

| | | | |
|---|---|---|---|
| 2004/0203710 A1 | 10/2004 | Gabor et al. | |
| 2004/0243711 A1* | 12/2004 | Rajaniemi | 709/227 |
| 2005/0009520 A1* | 1/2005 | Herrero et al. | 455/435.1 |
| 2005/0136926 A1* | 6/2005 | Tammi et al. | 455/435.1 |
| 2005/0141481 A1* | 6/2005 | Kauppinen | 370/352 |
| 2007/0189215 A1 | 8/2007 | Wu et al. | |

FOREIGN PATENT DOCUMENTS

| | | |
|---|---|---|
| CN | 1655546 A | 8/2005 |
| WO | WO 03/005669 A1 | 1/2003 |
| WO | WO 2004/045195 A1 | 5/2004 |

OTHER PUBLICATIONS

First Office Action in counterpart Chinese Application No. 200510118254.4, mailed Sep. 5, 2008.

First Office Action in counterpart Chinese Application No. 200510118255.9, mailed Feb. 15, 2008.

Second Office Action in counterpart Chinese Application No. 200510118255.9, mailed Aug. 15, 2008.

First Office Action in counterpart Chinese Application No. 200510120860.X, mailed Mar. 21, 2008.

Second Office Action in counterpart Chinese Application No. 200510120860.X, mailed Jun. 13, 2008.

Written Opinion in counterpart PCT Application No. PCT/CN2006/002244, mailed Dec. 28, 2006.

Communication of a Notice of Opposition in counterpart European Application No. 06775561.1-1244, mailed Sep. 28, 2010.

Extended European Search Report in counterpart European Application No. 06775561.1-1244, mailed Sep. 23, 2008.

First EP Office Action in corresponding European Application No. 06775561.1-1244, mailed May 13, 2009.

"3$^{rd}$ Generation Partnership Project: Technical Specification Group Core Network and Terminals; IMS Restoration Procedures (Release 8)," *3GPP*, 3GPP TS 23.380 V1.0.0 (Sep. 2008).

"3$^{rd}$ Generation Partnership Project: Technical Specification Group Services and System Aspects; IP Multimedia Subsystem (IMS); Stage 2 (Release 6)," *3GPP*, 3GPP TS 23.228 V6.10.0 (Jun. 2005).

"Digital cellular telecommunications system (Phase 2+); Universal Mobile Telecommunications System (UMTS); Internet Protocol (IP) multimedia call control protocol based on Session Initiation Protocol (SIP) and Session Description Protocol (SDP); Stage 3 (3GPP TS 24.229 version 5.13.0 Release 5)," *ETSI*, ETSI TS 124 229 V5.13.0 (Jun. 2005).

"3$^{rd}$ Generation Partnership Project; Technical Specification Group Core Network and Terminals; IP Multimedia (IM) Subsystem Cx and Dx interfaces; Signalling flows and message contents (Release 5)," *3GPP*, 3GPP TS 29.228 V5.12.0 (Jun. 2005).

"3$^{rd}$ Generation Partnership Project; Technical Specification Group Core Network and Terminals; IP multimedia call control protocol based on Session Initiation Protocol (SIP) and Session Description Protocol (SDP); Stage 3 (Release 7)," *3GPP*, 3GPP TS 24,229 V7.0.0 (Jun. 2005).

"3$^{rd}$ Generation Partnership Project; Technical Specification Group Core Network and Terminals; IP Multimedia (IM) Subsystem Cx and Dx interfaces; Signalling flows and message contents (Release 6)," *3GPP*, 3GPP TS 29.228 V6.7.0 (Jun. 2005).

Rosenberg, J., et al., "SIP: Session Initiation Protocol," Network Working Group, rfc3261.txt, Jun. 2002.

Oh, Sang-chul, et al., "The Serving CSCF Assignment Algorithm in Wireless IP Multimedia Networks," *IEEE*, 2004.

* cited by examiner

METHOD OF SESSION PROCESSING IN AN IMS AND INTERROGATING-CALL STATE CONTROL FUNCTION

CROSS REFERENCE TO RELATED APPLICATIONS

This application is a continuation of International Patent Application No. PCT/CN2006/002244, filed Aug. 31, 2006, which claims priority to Chinese Patent Application No. 200510099703.5, 200510099742.5, 200510105027.8, 200510118254.4, 200510118255.9, and 200510120860.X, filed Aug. 31, 2005, Sep. 5, 2005, Sep. 26, 2005, Oct. 21, 2005, Oct. 21, 2005, and Dec. 14, 2005, respectively. All of the above applications are hereby incorporated by reference.

FIELD OF THE INVENTION

The present invention relates to a communication technique, and in particular to a session processing method and an Interrogating-Call Session Control Function module in an IP Multimedia Subsystem (IMS).

BACKGROUND OF THE INVENTION

In an IP Multimedia Subsystem (IMS) network, when the User Equipment (UE) or a Public Service Identifier (PSI) of an IMS user acts as a called, an Interrogating-Call Session Control Function (I-CSCF) module in the called network inquires a Home Subscriber Server (HSS) about the registration location of the IMS user through a command Cx-Location-Query.

If the IMS user subscribes to an unregistered service (e.g. transfer-to-voice-mailbox), the HSS returns a Serving-CSCF (S-CSCF) for processing the registered service of the IMS user to the I-CSCF through a command Cx-Location-Query-Resp when the IMS user is in a REGISTERED state, the I-CSCF sends a Session Initiation Protocol (SIP) request to the S-CSCF returned from the HSS, and the S-CSCF processes the registered service of the IMS user.

If the IMS user subscribes to an unregistered service (e.g. transfer-to-voice-mailbox), the HSS returns an S-CSCF for processing the unregistered service of the IMS user to the I-CSCF through a command Cx-Location-QueryResp when the IMS user is in an UNREGISTERED state or a relevant identity identifier (ID) (e.g. the user equipment with the same number as the IMS user) has been registered or the relevant ID (e.g. the user equipment with the same number as the IMS user) is in an UNREGISTERED state, the I-CSCF sends a SIP request to the S-CSCF returned from the HSS, and the S-CSCF processes the unregistered service of the IMS user.

If the IMS user subscribes to an unregistered service (e.g. transfer-to-voice-mailbox), the HSS returns a set of S-CSCF capabilities required by the IMS user to the I-CSCF through a command Cx-Location-QueryResp when the IMS user is in a NOT REGISTERED state and the relevant ID (e.g. the user equipment with the same number as the IMS user) is also in a NOT REGISTERED state, the I-CSCF selects an satisfactory S-CSCF in accordance with the set of S-CSCF capabilities required by the IMS user and sends a SIP request to the selected S-CSCF, and the S-CSCF processes the unregistered service of the IMS user.

In the prior art, because the I-CSCF may be stateless, i.e. the I-CSCF, when sending a SIP message, may not await a response to the message, it may result in the following disadvantages.

When the S-CSCF forwards the SIP request or processes the registered service or unregistered service of the IMS user, the session will time out if the S-CSCF does not respond due to a device failure, or communication interruption, etc. so that the SIP request from the calling side will fail due to the time out (which may result in call loss).

Further, when the IMS user is in a REGISTERED state, the registered service of the called IMS user can not be executed, and even a network prompt like "The subscriber you dialed is out of service, please redial later" present in the existing network can not be provided.

When the called IMS user is in an UNREGISTERED state or the relevant ID has been registered or the relevant ID is in an UNREGISTERED state, the unregistered service of the called IMS user can not be executed, so that the IMS user can not be provided with a proper service for a long time over the IMS network (the IMS user can not be provided with a proper service over the IMS network until the S-CSCF resumes the service or the called IMS user registers successfully with another normal S-CSCF after powering on, which may last for a long time such as hours, days or even longer).

When the IMS user is in a NOT REGISTERED state and the relevant ID is also in a NOT REGISTERED state, the unregistered service of the called IMS user can not be executed.

SUMMARY OF THE INVENTION

The invention is to provide a session processing method and an interrogating-call session control function module in an IP based Multimedia Subsystem (IMS). When a selected S-CSCF does not respond due to a device failure, or a communication interruption, etc. another S-CSCF may be selected, thereby improving the session success ratio or providing the network prompt like "The subscriber you dialed is out of service, please redial later".

The invention provides a session processing method in an Internet Protocol multimedia subsystem, including: receiving an initial request for a called user and acting as a stateful proxy by an Interrogating-Call Session Control Function (I-CSCF) module, or inquiring a Home Subscriber Server (HSS) about the registration location of the called user and acting as a stateful proxy in accordance with a response from the HSS, by the I-CSCF; inquiring, by the I-CSCF, a Home Subscriber Server (HSS) about the registration location of the called user; sending, by the I-CSCF, a Session Initiation Protocol (SIP) request to a Serving-Call Session Control Function (S-CSCF) module in accordance with a response from the HSS; and awaiting, by the I-CSCF, a response from the S-CSCF, and reselecting an S-CSCF if receiving no response from the S-CSCF, and sending a SIP request to the S-CSCF.

The step of sending, by the I-CSCF, a Session Initiation Protocol (SIP) request to a Serving-Call Session Control Function (S-CSCF) module obtained from a response from the HSS further includes: sending, by the I-CSCF, a SIP request to an S-CSCF for processing, if the response from the HSS includes the URI of the S-CSCF.

The step of reselecting an S-CSCF includes: obtaining, by the I-CSCF, a set of S-CSCF capabilities required by the called user, selecting an S-CSCF in accordance with the set of S-CSCF capabilities, and sending a SIP request to the selected S-CSCF for processing.

The step of obtaining, by the I-CSCF, of a set of S-CSCF capabilities required by the called user includes: obtaining a set of S-CSCF capabilities required by the called user by modifying a command Cx-Location-Query or Cx-Select-Pull;

the step of modifying a command Cx-Select-Pull includes adding a user location query type parameter User-Location-Type AVP in the command; and the step of modifying a command Cx-Select-Pull includes modifying the IMPI attribute type of the command as being conditional.

The step of sending, by the I-CSCF, a Session Initiation Protocol (SIP) request to a Serving-Call Session Control Function (S-CSCF) module obtained from a response from the HSS further includes: selecting an S-CSCF in accordance with a set of S-CSCF capabilities required by the called user and sending a SIP request to the selected S-CSCF for processing, by the I-CSCF, if the response from the HSS includes the set of S-CSCF capabilities required by the called user.

The step of sending, by the I-CSCF, a Session Initiation Protocol (SIP) request to a Serving-Call Session Control Function (S-CSCF) module obtained from a response from the HSS further includes: storing, by the I-CSCF, the set of S-CSCF capabilities required by the called user returned from the HSS.

The step of reselecting an S-CSCF includes: selecting an S-CSCF in accordance with the set of S-CSCF capabilities and sending the SIP request to the selected S-CSCF, by the I-CSCF.

The step of sending, by the I-CSCF, a Session Initiation Protocol (SIP) request to a Serving-Call Session Control Function (S-CSCF) module obtained from a response from the HSS further includes: selecting, by the I-CSCF, arbitrarily an S-CSCF to which a SIP request is sent, if the response from the HSS includes neither the URI of any S-CSCF nor a set of S-CSCF capabilities required by the called user.

The step of reselecting an S-CSCF includes: selecting, by the I-CSCF, arbitrarily an S-CSCF to which a SIP request is sent.

The step of sending, by the I-CSCF, a Session Initiation Protocol (SIP) request to a Serving-Call Session Control Function (S-CSCF) module obtained from a response from the HSS further includes: further containing a set of S-CSCF capabilities required by the called user in the response returned from the HSS to the I-CSCF.

The step of reselecting an S-CSCF includes: selecting an S-CSCF in accordance with the set of S-CSCF capabilities and sending a SIP request to the selected S-CSCF for processing, by the I-CSCF.

The I-CSCF returns a 600 to the called user if the I-CSCF can not select any S-CSCF in accordance with a set of S-CSCF capabilities required by the IMS user, and thereafter shall not forward any SIP response returned from the S-CSCF on receiving the SIP response.

The invention also provides a session processing method in an Internet Protocol multimedia subsystem, including: discovering, by an Interrogating-Call Session Control Function (I-CSCF) module, that an Serving-Call Session Control Function S-CSCF module currently serving a user is in an unavailable state, and selecting, by the I-CSCF, an S-CSCF other than the unavailable S-CSCF, and routing all calls of the called user to the reselected S-CSCF for processing.

The method further includes: receiving, by the I-CSCF, an initial request to the called user; inquiring, by the I-CSCF, a Home Subscriber Server (HSS) the registration location of the called user; sending, by the I-CSCF, a Session Initiation Protocol (SIP) request to the S-CSCF in accordance with a response from the HSS; and awaiting, by the I-CSCF, a response from the S-CSCF.

The step of sending, by the I-CSCF, a Session Initiation Protocol (SIP) request to the S-CSCF in accordance with a response from the HSS further includes: sending, by the I-CSCF, a SIP request to an S-CSCF for processing, if the response from the HSS includes the Uniform Resource Locator (URI) of the S-CSCF.

The step of selecting, by the I-CSCF, an S-CSCF other than the unavailable S-CSCF includes: obtaining, by the I-CSCF, a set of S-CSCF capabilities required by the called user; and selecting, by the I-CSCF, an S-CSCF other than the unavailable S-CSCF in accordance with the set of S-CSCF capabilities.

The step of obtaining, by the I-CSCF, a set of S-CSCF capabilities required by the called user includes: requesting, by the I-CSCF, the HSS for information on the set of capabilities; and returning, by the HSS, the information on the set of capabilities to the I-CSCF on receiving the request, on perceiving that the S-CSCF currently serving the user is unavailable.

The I-CSCF requests the information on the set of capabilities by sending to the HSS a location information request which is extended by newly adding in the location information request command an information element including at least the value of the request for the information on the set of capabilities; the HSS considers that the location information request is a query about user location information if the request does not include the newly added information element; and the HSS determines whether the request belongs to a request for the information on the set of capabilities in accordance with whether the request includes the newly added information element and the value of the newly added information element.

The location information request command includes Cx-Location-Query and Cx-Select-Pull;

if the location information request command is Cx-Location-Query, the step of newly adding an information element includes adding a location query type AVP (User-Location-Type AVP) parameter in the command; and if the location information request command is Cx-Select-Pull, the step of newly adding an information element includes modifying an IMPI attribute type as being conditional.

The HSS checks whether to allow the I-CSCF to perform the reselection on receiving the request in a manner that if the HSS considers that the current S-CSCF can resume on its own initiative so that it is unnecessary for the I-CSCF to perform the reselection, the HSS returns an error code in a response message to the request for the set of capabilities to notify the I-CSCF of unnecessary reselection; otherwise the HSS allows the I-CSCF to perform the reselection and returns the information on the set of capabilities.

If the HSS allows the I-CSCF to perform the reselection, the HSS further checks the registered state of a public user identifier included in the request, and allows the reselection only if no public user identifier in a registered state is present throughout a subscription in the Internet Protocol multimedia subsystem; and in this case, the checking of the user state by the HSS includes:

A1. returning by the HSS an error if the public user identifier included in the request is in a registered state;

A2. if the public user identifier included in the request is in a unregistered or de-registered state, further determining whether a public user identifier in a registered state is present in the same subscription; if yes, returning an error; otherwise further determining whether an unregistered service is present for the public user identifier included in the request; if not, returning an error; if an unregistered service is present for the public user identifier included in the request, directly returning the information on the set of capabilities by the HSS for an unregistered state, and determining by the HSS whether a public user identifier in an unregistered state is present in the same subscription for a deregistered state; if yes, returning by the HSS the information on the set of capabilities; otherwise returning by the HSS an error.

If the HSS allows the I-CSCF to perform the reselection, the HSS further checks the registered state of a public user identifier included in the request and allows the reselection if a public user identifier in a registered state is present in a subscription; and in this case, the checking the user state by the HSS includes:

B1. if the public user identifier is in a registered state, further determining by the HSS whether an unregistered service is present for the user; if yes, returning by the HSS the information on the set of capabilities; if not, returning by the HSS an error; and B2. if the public user identifier is in an unregistered or deregistered state, further determining by the HSS whether an unregistered service is present for the user; if not, returning by the HSS an error; if yes, directly returning by the HSS the information on the set of capabilities for an unregistered state, and further checking by the HSS whether at least one allocated S-CSCF is present for other public user identifiers in the same subscription relationship for a deregistered state; if yes, returning by the HSS the information on the set of capabilities; otherwise returning by the HSS an error.

If the I-CSCF supports a reselection feature and the HSS does not support the reselection feature, the HSS can not identify the newly added information element in the location information request command and still returns a response with the current S-CSCF address; on receiving the response, the I-CSCF determines that the HSS does not support the feature and returns a failure response to the calling party without performing reselection of any S-CSCF.

The I-CSCF supporting the reselection of an S-CSCF carries an information element SupportFeature in the first user location information command and indicates in the information element that the I-CSCF supports the reselection feature; the HSS also carries an information element SupportFeature in the response and lists therein its supported features; the I-CSCF further determines whether the HSS also supports the reselection on receiving the response; if yes, the I-CSCF further requests explicitly the information on the set of capabilities; if it is indicated in the response that the HSS does not support the reselection or the information element is not present in the response, the I-CSCF returns a failure response to the calling party without performing the reselection of any S-CSCF.

The step of obtaining, by the I-CSCF, a set of S-CSCF capabilities required by the called user includes: sending, by the HSS, the S-CSCF name and the information on the set of capabilities directly to the I-CSCF; contacting by the I-CSCF the returned S-CSCF firstly on receipt thereof; and further reselecting by the I-CSCF an S-CSCF in accordance with the returned information on the set of capabilities if the S-CSCF is unavailable indeed.

The I-CSCF carries an information element of SupportFeature in the first user location information request command for inquiring about the user location information and indicates in the information element whether the I-CSCF supports the reselection feature; the HSS returns no information on the set of capabilities in the response if the HSS supports the reselection but discovers that the information element in the request indicates that the I-CSCF does not support the reselection feature or that the information element is not present; and the HSS ignores the information element and returns in the response only the current S-CSCF name of the user if the HSS does not the reselection.

The HSS sets a reselection flag when sending the information on the set of capabilities; a timer is started at the I-CSCF or the HSS when beginning with the reselection to monitor the reselection; the I-CSCF instructs the HSS to delete the reselection flag or the HSS deletes the reselection flag on its own initiative if the reselection is not finished when the timer expires; otherwise the reselected S-CSCF instructs the HSS to delete the reselection flag.

The I-CSCF instructs the HSS to delete the reselection flag by sending to the HSS a location information request command in which the HSS is requested to delete the S-CSCF reselection flag of the user in a way that the location information request command is extended by newly adding in the location information request command an information element including at least the value of an instruction of deleting the S-CSCF reselection flag; and the HSS determines whether the request belongs to a request for deleting the reselection flag in accordance with whether the request includes the newly added information element and the value of the newly added information element.

If the reselected S-CSCF is in a normal state and the HSS discovers, in a command sent from the S-CSCF to the HSS to request to download user data, the setting of the S-CSCF reselection flag of the user, the HSS deletes the reselection flag of the user and stores an S-CSCF name in the request; and the HSS returns an error if the reselection flag is not set.

The HSS deletes the S-CSCF reselection flag of the user unconditionally on receiving a multimedia authentication request command for the present registration and stores for the user an S-CSCF name carried in the multimedia authentication request, if the user sets the S-CSCF reselection flag and initiates a re-registration process within this period.

If the user sets the S-CSCF reselection flag, acts again as a called within this period, and the HSS receives again a request for sending a set of S-CSCF capabilities from the I-CSCF, the HSS maintains the setting of the S-CSCF reselection flag in the processing of the previous request.

If a calling party aborts on his own initiative the call during the reselection, the I-CSCF sends a location information request command instructing the HSS to delete the reselection flag when the present reselection timer expires or sends a location information request command to instruct the HSS to delete the reselection flag on receiving a cancel request from the calling party.

The HSS deletes the reselection flag immediately on receiving the location information request command instructing to delete the reselection flag; or the HSS maintains locally a counter which starts counting from a base number, performs an action on each receiving a location information request command explicitly requesting a set of capabilities and performs an opposite action on receiving a location information request command instructing to delete the reselection flag; and the HSS deletes the reselection flag in the processing of the present location information request command only if the counter becomes the base number.

The invention further provides an I-CSCF in an Internet Protocol multimedia subsystem in a multimedia subsystem, wherein if the I-CSCF perceives that an S-CSCF currently serving a user is in an unavailable state during a routing process, the I-CSCF requests an HSS for information on a set of S-CSCF capabilities and receives the information on a set of capabilities returned from the HSS; and the I-CSCF selects an S-CSCF other than the unavailable S-CSCF on receiving the information on a set of capabilities and routes all subsequent calls of the called user to the reselected S-CSCF.

Therefore according to the invention, if the S-CSCF returned from the HSS, which processes the unregistered service of an IMS user, returns no response due to a device failure or a communication interruption, etc., the I-CSCF reselects an S-CSCF for processing the unregistered service of the IMS user in accordance with a set of S-CSCF capabilities required by the IMS user. If the reselected S-CSCF processes the unregistered service of the IMS user successfully, the failure of the SIP request from the calling side due to the time out can be avoided and the unregistered service of the called IMS user can be also executed properly, thereby avoiding the serious disadvantage of possible occurrence that the proper service can not be provided for the IMS user for a long time.

DETAILED DESCRIPTION OF THE INVENTION

Embodiments of the invention are described with reference to the drawings in order to facilitate the understanding and implementation of the invention by those ordinarily skilled in the art.

Figure 1:
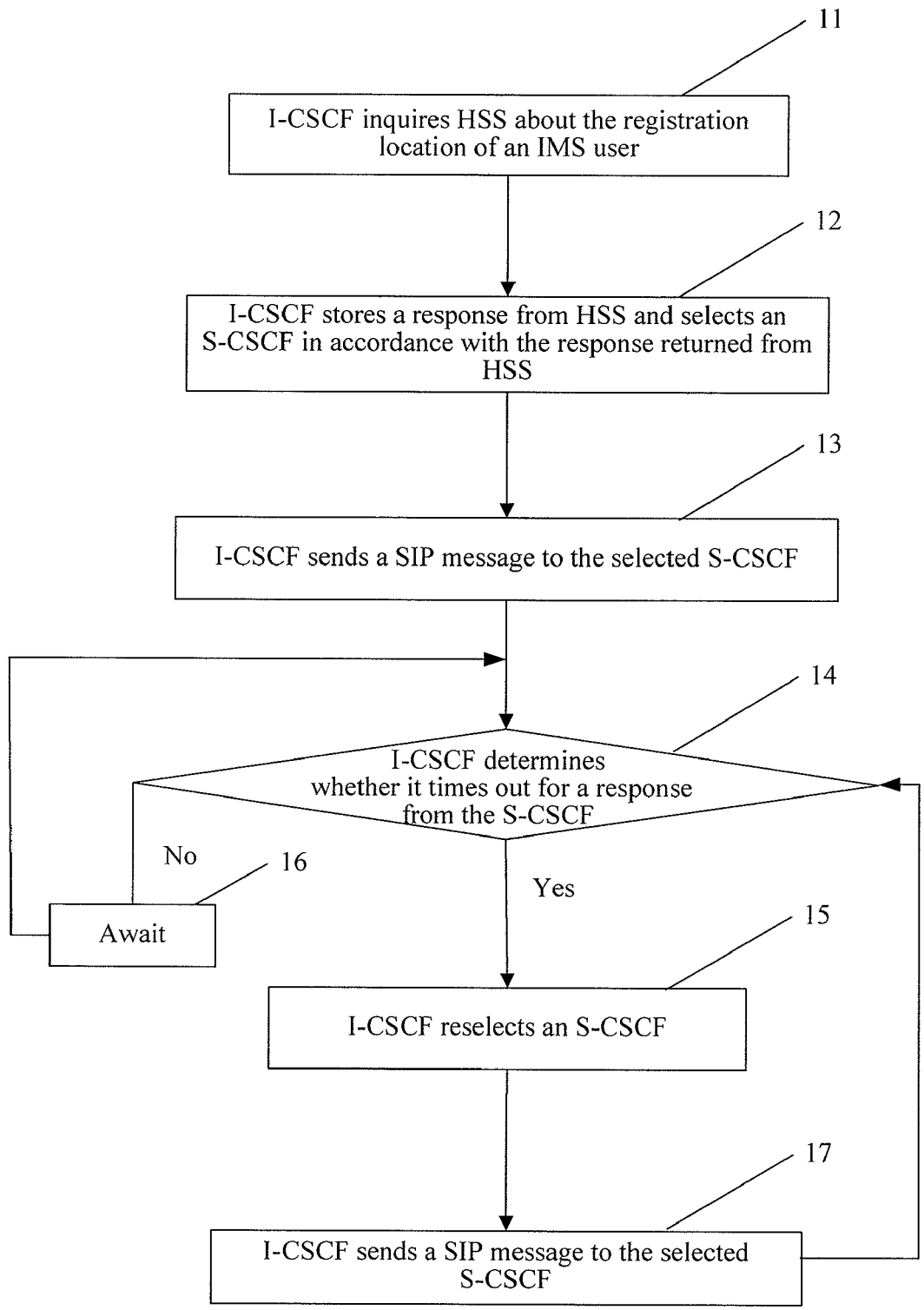
FIG. 1 illustrates a flow chart of calling an IMS user according to the invention.

An essential idea of the invention lies in that as illustrated in FIG. 1, the I-CSCF inquires the HSS about the registration location of a called user (including an PSI) in the step 11; the I-CSCF stores a response from the HSS, and selects an S-CSCF in accordance with the response from the HSS in the step 12; and the I-CSCF sends a SIP request to the selected S-CSCF in the step 13.

The I-CSCF determines whether it times out for a response of the S-CSCF in the step 14.

If it times out, the I-CSCF reselects an S-CSCF in the step 15, and sends a SIP request to the S-CSCF in the step 17, and then the procedure returns to the step 14.

Otherwise the procedure goes to the step 16 where the I-CSCF awaits a response of the S-CSCF.

The First Embodiment

In an IMS network, if a UE of an IMS user acts as a called and after the I-CSCF in the called network receives an initial request, it is determined that the I-CSCF is stateful, indicating that the I-CSCF awaits a response to a SIP message after sending the SIP message. A failure processing will be started if the I-CSCF receives no response within a prescribed period of time. The I-CSCF will inquire the HSS about the registration location of the IMS user through a command Cx-Location-Query.

If the IMS user subscribes to an unregistered service (e.g. transfer-to-voice-mailbox), the HSS returns an S-CSCF for processing the registered service of the IMS user and a set of S-CSCF capabilities required by the IMS user to the I-CSCF through a command Cx-Location-QueryResp when the IMS user is in a REGISTERED state.

If the IMS user subscribes to an unregistered service (e.g. transfer-to-voice-mailbox, etc.), the HSS returns an S-CSCF for processing the unregistered service of the IMS user and a set of S-CSCF capabilities required by the IMS user to the I-CSCF through a command Cx-Location-QueryResp when the IMS user is in an UNREGISTERED state or a relevant ID has been registered or the relevant ID is in an UNREGISTERED state.

If the IMS user subscribes to an unregistered service (e.g. transfer-to-voice-mailbox), the HSS returns a set of S-CSCF capabilities required by the IMS user to the I-CSCF through a command Cx-Location-QueryResp when the IMS user is in a NOT REGISTERED state and the relevant ID is also in a NOT UNREGISTERED state.

The I-CSCF checks the response returned from the HSS on receiving the response:

I—If the response includes the URI of an S-CSCF, the I-CSCF sends the SIP request to the S-CSCF returned from the HSS after performing a processing as specified in the 3GPP specification, and the S-CSCF returns a temporary response 100 (optional for a non-session SIP request) and processes the registered service or unregistered service of the IMS user.

II—If the response does not include the URI of any S-CSCF, the I-CSCF shall check whether the response includes a set of S-CSCF capabilities required by the IMS user.

a) If the response includes a set of S-CSCF capabilities required by the IMS user, the I-CSCF shall store the set of S-CSCF capabilities required by the IMS user and select a satisfactory S-CSCF in accordance with the set of S-CSCF capabilities required by the IMS user.

b) If the response does not include a set of S-CSCF capabilities required by the IMS user, the I-CSCF shall store in a Diameter response message an indication indicating that the unregistered service of the IMS user is required to be processed, and the I-CSCF selects an S-CSCF arbitrarily.

c) The I-CSCF sends the SIP request to the selected S-CSCF after performing a processing as specified in the 3GPP specification, and the S-CSCF returns a temporary response 100 (optional for a non-session SIP request) and processes the unregistered service of the IMS user.

If the S-CSCF returns no response due to a device failure, a communication interruption, etc., the I-CSCF shall check whether it has stored a set of S-CSCF capabilities required by the IMS user.

1. If the I-CSCF has stored a set of S-CSCF capabilities required by the IMS user, the I-CSCF shall select a satisfactory S-CSCF in accordance with the set of S-CSCF capabilities required by the IMS user stored previously.

2. If the I-CSCF has not stored a set of S-CSCF capabilities required by the IMS user, the I-CSCF checks whether it has stored in a Diameter response message an indication indicating that the unregistered service of the IMS user is required to be processed.

1) If the I-CSCF has stored in a Diameter response message an indication indicating that the unregistered service of the IMS user is required to be processed, the I-CSCF selects an S-CSCF arbitrarily.

2) If the I-CSCF has not stored in a Diameter response message an indication indicating that the unregistered service of the IMS user is required to be processed, the I-CSCF inquires about a set of S-CSCF capabilities required by the IMS user through a Cx-Location-Query. However, the I-CSCF can not instruct the HSS to return a set of capabilities because the command Cx-Location-Query does not include a User-Location-Type AVP. Therefore, it is required to add a User-Location-Type AVP in the command Cx-Location-Query. If the User-Location-Type is a query about a set of S-CSCF capabilities, the HSS sets a reselection flag and a timer and returns a set of S-CSCF capabilities required by the IMS user. And the I-CSCF selects a satisfactory S-CSCF in accordance with the set of S-CSCF capabilities required by the IMS user.

The I-CSCF sends the SIP request to the selected S-CSCF after performing a processing as specified in the 3GPP specification. The S-CSCF processes the unregistered service of the IMS user and provides a network prompt like "The subscriber you dialed is out of service, please redial later" present in the existing network.

If the I-CSCF can not select a satisfactory S-CSCF in accordance with the set of S-CSCF capabilities required by the IMS user, the I-CSCF shall return a response 600.

If the I-CSCF then receives a SIP response returned from the original S-CSCF, the I-CSCF shall not forward the SIP response.

On receiving the SIP request sent from the I-CSCF, the S-CSCF checks the registration state of the IMS user. If the S-CSCF finds no user data, it notifies the HSS of the registration state of the IMS user and the S-CSCF URI and obtains user subscription data through commands Cx-Put and Cx-Pull. On receiving the commands Cx-Put and Cx-Pull sent from the S-CSCF, the HSS deletes the reselection flag and checks the S-CSCF URI. If the S-CSCF URI is different from the original S-CSCF URI, the HSS instructs the original S-CSCF to deregister the IMS user through a command Cx-Deregister and deletes the user subscription data. On receiving the command Cx-Deregister sent from the HSS, the original S-CSCF deregisters the IMS user and releases all sessions of the IMS user. If the S-CSCF has received the SIP request sent from the I-CSCF previously, the S-CSCF sends a request BYE to the I-CSCF. The I-CSCF shall not forward the request BYE on receiving the request BYE.

Figure 2:
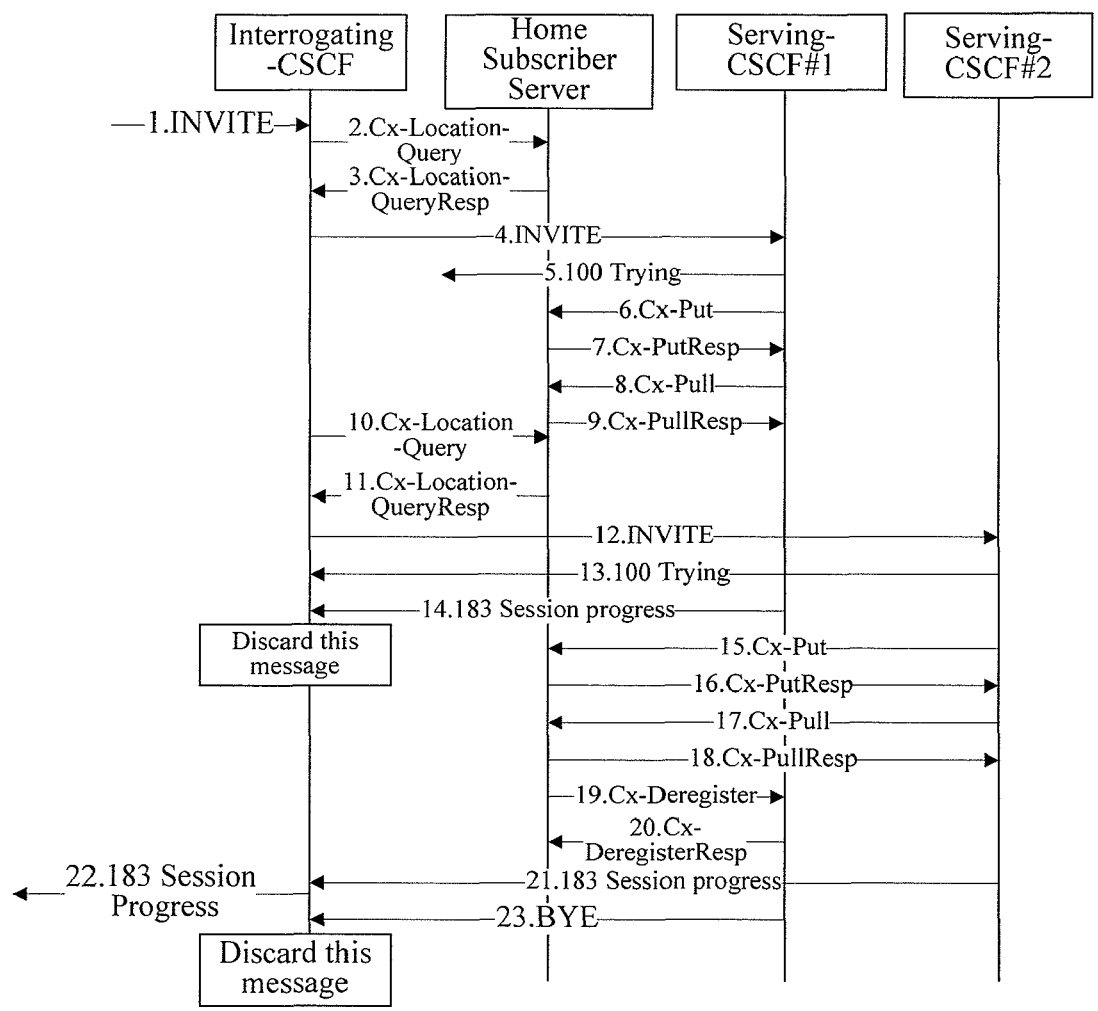
FIG. 2 illustrates a signaling diagram of calling an IMS user in which a set of S-CSCF capabilities is obtained by using an extended command Cx-Location-Query upon discovery of the failure of the S-CSCF currently providing service according to the invention.

A call procedure of the invention is described below with reference to the drawings, as illustrated in FIG. 2.

In step 1, the I-CSCF receives an initial request (INVITE).

In step 2, the I-CSCF inquires the HSS about the registration location of the IMS user through a command Cx-Location-Query.

In step 3, the HSS returns a query result (e.g. an S-CSCF) to the I-CSCF.

In step 4, the I-CSCF sends a SIP request to the S-CSCF#1 returned from the HSS.

In step 5, the I-CSCF receives no response from the S-CSCF#1.

In step 6, the S-CSCF#1 notifies the HSS of an S-CSCF URI through a command Cx-Put.

In step 7, the HSS returns an execution result of the command Cx-Put to the S-CSCF#1.

In step 8, the S-CSCF#1 retrieves user data from the HSS through a command Cx-Pull.

In step 9, the HSS returns an execution result of the command Cx-Pull to the S-CSCF#1.

In step 10, the I-CSCF inquires the HSS about a set of S-CSCF capabilities required by the IMS user through a command Cx-Location-Query.

In step 11, the HSS returns an execution result of Cx-Location-Query to the I-CSCF.

In step 12, the I-CSCF selects another satisfactory S-CSCF in accordance with the set of S-CSCF capabilities required by the IMS user and sends a SIP request to the selected S-CSCF#2.

In step 13, the S-CSCF#2 returns a response 100 Trying to the I-CSCF.

In step 14, the S-CSCF#1 returns a response, and the I-CSCF shall not forward the response.

In step 15, the S-CSCF#2 notifies the HSS of an S-CSCF URI through a command Cx-Put.

In step 16, the HSS returns an execution result of the command Cx-Put to the S-CSCF#2.

In step 17, the S-CSCF#2 retrieves user data from the HSS through a command Cx-Pull.

In step 18, the HSS returns an execution result of the command Cx-Pull to the S-CSCF#2.

In step 19, the HSS instructs the S-CSCF#1 to deregister the IMS user through a command Cx-Deregister.

In step 20, the S-CSCF#1 returns an execution result of the command Cx-Deregister to the S-CSCF#1.

In step 21, the S-CSCF#2 returns a response 183 Session Progress to the I-CSCF.

In step 22, the I-CSCF forwards the response 183 Session Progress.

In step 23, the S-CSCF#1 initiates a request BYE, and the I-CSCF shall not forward the request.

In the above call procedure, the I-CSCF inquires about the set of S-CSCF capabilities required by the IMS user through the Cx-Location-Query. Alternatively, the following two methods may be used to obtain the set of S-CSCF capabilities.

Figure 3:
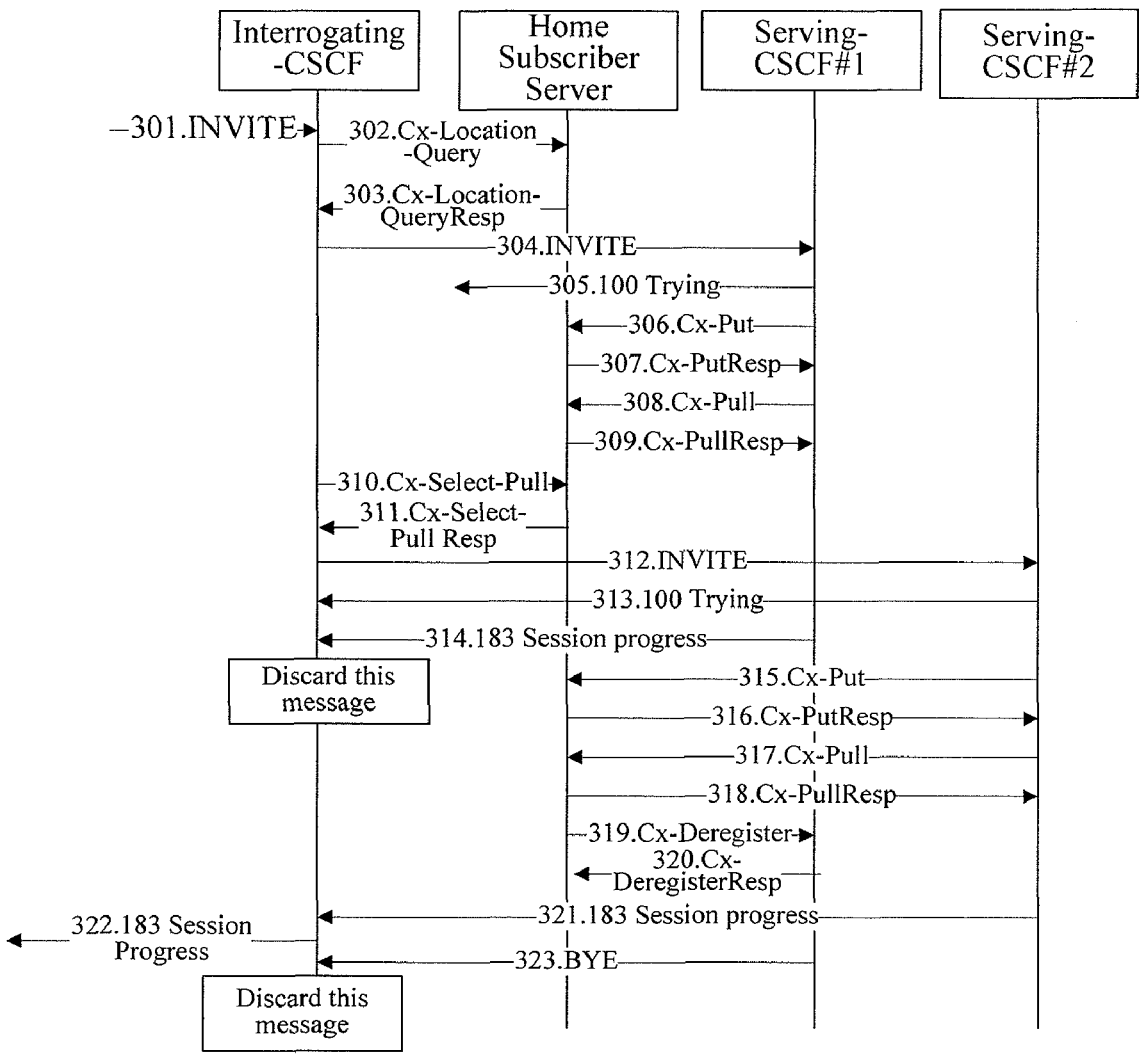
FIG. 3 illustrates a signaling diagram of calling an IMS user in which a set of S-CSCF capabilities is obtained by using a parameter modification command Cx-Select-Pull upon discovery of the failure of the S-CSCF currently providing service according to the invention.

1. The I-CSCF inquires about the set of S-CSCF capabilities required by the IMS user through a Cx-Select-Pull. However, because the command Cx-Select-Pull shall include an IMPI and the I-CSCF can not obtain the IMPI, the IMPI in the command Cx-Select-Pull is required to be modified as being conditional in a way that the absence of an IMPI is possible when the User Authorization Type is a query about the set of capabilities and a satisfactory S-CSCF is selected in accordance with the set of S-CSCF capabilities required by the IMS user. Therefore, as illustrated in FIG. 3, a call procedure of the invention is described below with reference to FIG. 3.

In step 301, the I-CSCF receives an initial request (INVITE).

In step 302, the I-CSCF inquires the HSS about the registration location of the IMS user through a command Cx-Location-Query.

In step 303, the HSS returns a query result (e.g. an S-CSCF) to the I-CSCF.

In step 304, the I-CSCF sends a SIP request to the S-CSCF#1 returned from the HSS.

In step 305, the I-CSCF receives no response from the S-CSCF#1.

In step 306, the S-CSCF#1 notifies the HSS of an S-CSCF URI through a command Cx-Put.

In step 307, the HSS returns an execution result of the command Cx-Put to the S-CSCF#1.

In step 308, the S-CSCF#1 retrieves user data from the HSS through a command Cx-Pull.

In step 309, the HSS returns an execution result of the command Cx-Pull to the S-CSCF#1.

In step 310, the I-CSCF inquires the HSS about a set of S-CSCF capabilities required by the IMS user through a command Cx-Select-Pull.

In step 311, the HSS returns an execution result of Cx-Select-Pull to the I-CSCF.

In step 312, the I-CSCF selects another satisfactory S-CSCF in accordance with the set of S-CSCF capabilities required by the IMS user and sends a SIP request to the selected S-CSCF#2.

In step 313, the S-CSCF#2 returns a response 100 Trying to the I-CSCF.

In step 314, the S-CSCF#1 returns a response and the I-CSCF shall not forward the response.

In step 315, the S-CSCF#2 notifies the HSS of an S-CSCF URI through a command Cx-Put.

In step 316, the HSS returns an execution result of the command Cx-Put to the S-CSCF#2.

In step 317, the S-CSCF#2 retrieves user data from the HSS through a command Cx-Pull.

In step 318, the HSS returns an execution result of the command Cx-Pull to the S-CSCF#2.

In step 319, the HSS instructs the S-CSCF#1 to deregister the IMS user through a command Cx-Deregister.

In step 320, the S-CSCF#1 returns an execution result of the command Cx-Deregister to the S-CSCF#1.

In step 321, the S-CSCF#2 returns a response 183 Session Progress to the I-CSCF.

In step 322, the I-CSCF forwards the response 183 Session Progress.

In step 323, the S-CSCF#1 initiates a request BYE and the I-CSCF shall not forward the request.

Figure 4:
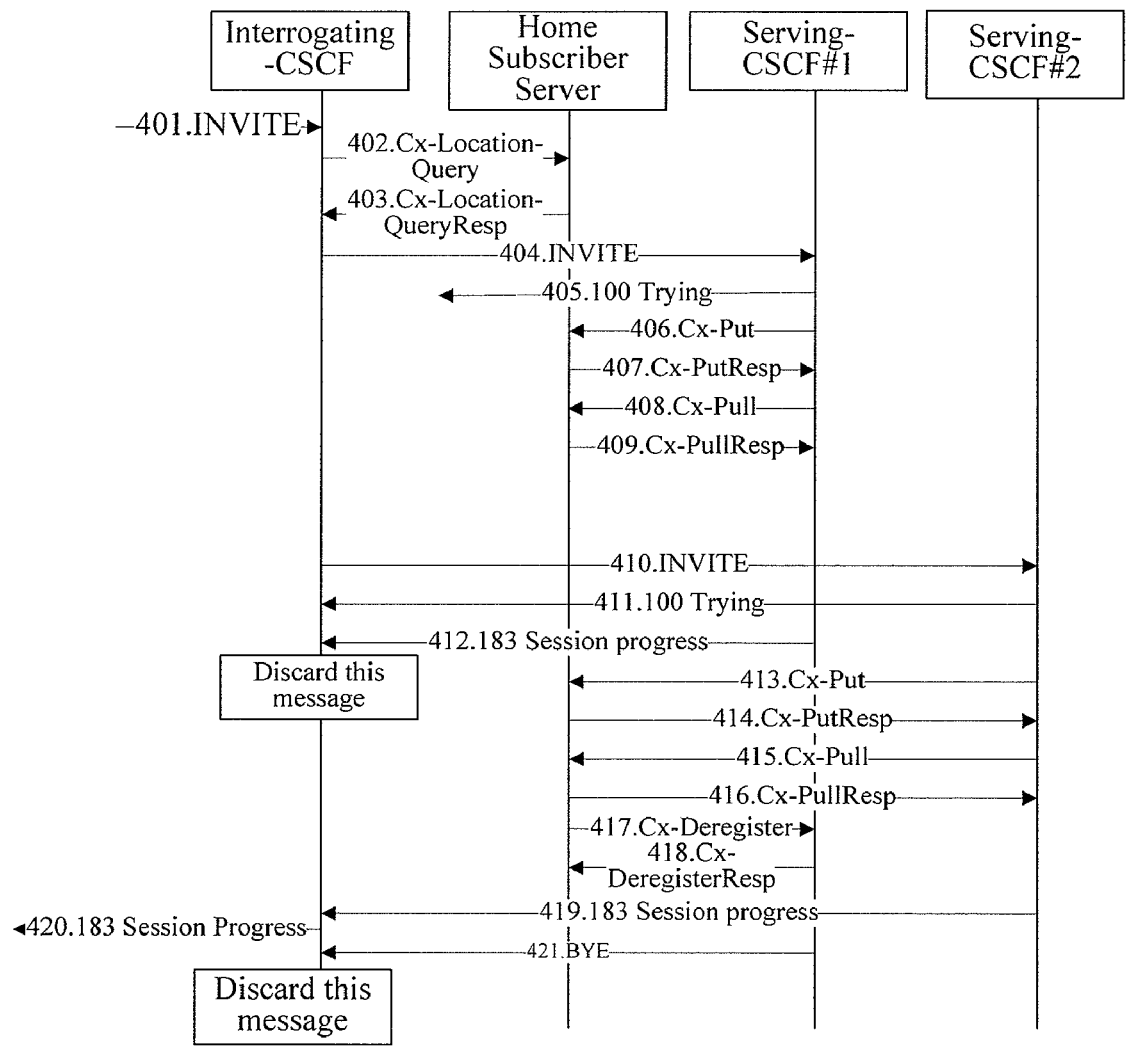
FIG. 4 illustrates a signaling diagram of calling an IMS user in which an HSS returns a response while returning a set of S-CSCF capabilities according to the invention.

2. Alternatively, the HSS may return an S-CSCF for processing the registered (or unregistered) service of the IMS user and a set of S-CSCF capabilities required by the IMS user to the I-CSCF through a command Cx-Location-Query-Resp when the I-CSCF inquires the HSS about the registration location of the IMS user through a command Cx-Location-Query. A call procedure of the invention is described below with reference to FIG. 4.

In step 401, the I-CSCF receives an initial request (INVITE).

In step 402, the I-CSCF inquires the HSS about the registration location of the IMS user through a command Cx-Location-Query.

In step 403, the HSS returns a query result (e.g. an S-CSCF) to the I-CSCF.

In step 404, the I-CSCF sends a SIP request to the S-CSCF#1 returned from the HSS.

In step 405, the I-CSCF receives no response from the S-CSCF#1.

In step 406, the S-CSCF#1 notifies the HSS of an S-CSCF URI through a command Cx-Put.

In step 407, the HSS returns an execution result of the command Cx-Put to the S-CSCF#1.

In step 408, the S-CSCF#1 retrieves user data from the HSS through a command Cx-Pull.

In step 409, the HSS returns an execution result of the command Cx-Pull to the S-CSCF#1.

In step 410, the I-CSCF selects another satisfactory S-CSCF in accordance with a set of S-CSCF capabilities required by the IMS user and sends a SIP request to the selected S-CSCF#2.

In step 411, the S-CSCF#2 returns a response 100 Trying to the I-CSCF.

In step 412, the S-CSCF#1 returns a response and the I-CSCF can not forward the response.

In step 413, the S-CSCF#2 notifies the HSS of an S-CSCF URI through a command Cx-Put.

In step 414, the HSS returns an execution result of the command Cx-Put to the S-CSCF#2.

In step 415, the S-CSCF#2 retrieves user data from the HSS through a command Cx-Pull.

In step 416, the HSS returns an execution result of the command Cx-Pull to the S-CSCF#2.

In step 417, the HSS instructs the S-CSCF#1 to deregister the IMS user through a command Cx-Deregister.

In step 418, the S-CSCF#1 returns an execution result of the command Cx-Deregister to the S-CSCF#1.

In step 419, the S-CSCF#2 returns a response 183 Session Progress to the I-CSCF.

In step 420, the I-CSCF forwards the response 183 Session Progress.

In step 421, the S-CSCF#1 initiates a request BYE and the I-CSCF can not forward the request.

The Second Embodiment

In an IMS network, if a UE of an IMS user acts as a called and after the I-CSCF in the called network receives an initial request, the I-CSCF will inquire an HSS about the registration location of the IMS user through a command Cx-Location-Query.

If the IMS user subscribes to an unregistered service (e.g. transfer-to-voice-mailbox), the HSS returns an indication DIAMETER_SOME_ID_UNREGISTERED and an S-CSCF for processing the unregistered service of the IMS user to the I-CSCF through, e.g. a command Cx-Location-QueryResp when the IMS user is in an UNREGISTERED state or a relevant ID is in an UNREGISTERED state and neither is in a REGISTERED state.

If the IMS user subscribes to an unregistered service (e.g. transfer-to-voice-mailbox), the HSS returns an indication DIAMETER_UNREGISTERED_SERVICE and a set of S-CSCF capabilities required by the IMS user to the I-CSCF through, e.g. a command Cx-Location-QueryResp when the IMS user is in a NOT REGISTERED state and the relevant ID is also in a NOT UNREGISTERED state.

In summary for above, the HSS may return a response which includes an S-CSCF for processing the registered service or unregistered service and a set of S-CSCF capabilities required by the called user (or the set of S-CSCF capabilities required by the called user is null) through a response message Diameter.

The I-CSCF checks the response returned from the HSS on receiving the response. If the response includes the indication DIAMETER_SOME_ID_UNREGISTERED or DIAMETER_UNREGISTERED_SERVICE, the I-CSCF shall act as a stateful proxy.

If the response includes the URI of an S-CSCF, the I-CSCF sends a SIP request to the S-CSCF returned from the HSS after performing a processing as specified in the 3GPP specification, and the S-CSCF returns a temporary response 100 (optional for a non-session SIP request) and processes the registered service or unregistered service of the IMS user.

If the response does not include the URI of any S-CSCF, the I-CSCF shall check whether the response includes a set of S-CSCF capabilities required by the IMS user.

a) If the response includes a set of S-CSCF capabilities required by the IMS user, the I-CSCF shall store the set of S-CSCF capabilities required by the IMS user and select a satisfactory S-CSCF in accordance with the set of S-CSCF capabilities required by the IMS user.

b) If the response does not include a set of S-CSCF capabilities required by the IMS user, the I-CSCF shall store the indication DIAMETER_UNREGISTERED_SERVICE, and select an S-CSCF arbitrarily.

c) The I-CSCF sends the SIP request to the selected S-CSCF after performing a processing as specified in the 3GPP specification, and the S-CSCF returns a temporary response 100 (optional for a non-session SIP request) and processes the unregistered service of the IMS user.

If the S-CSCF returns no response within a prescribed period of time due to a device failure, a communication interruption, etc., the I-CSCF acting as a stateful proxy performs a failure processing. A procedure of failure processing is described below in which the I-CSCF firstly checks whether the I-CSCF has stored a set of S-CSCF capabilities required by the IMS user.

1. If the I-CSCF has stored a set of S-CSCF capabilities required by the IMS user, the I-CSCF selects an S-CSCF in accordance with the stored set of S-CSCF capabilities required by the IMS user.

2. If the I-CSCF has not stored a set of S-CSCF capabilities required by the IMS user, the I-CSCF checks whether the I-CSCF has stored an indication DIAMETER_UNREGISTERED SERVICE.

1) If the I-CSCF has stored an indication DIAMETER_UNREGISTERED_SERVICE, the I-CSCF selects an S-CSCF arbitrarily.

2) If the I-CSCF has not stored the indication DIAMETER_UNREGISTERED_SERVICE, the I-CSCF inquires about a set of S-CSCF capabilities required by the IMS user through a Cx-Location-Query. However, the I-CSCF can not instruct the HSS to return the set of capabilities because the command Cx-Location-Query does not include a User-Location-Type AVP. Therefore, it is required to add the User-Location-Type AVP in the command Cx-Location-Query. When the User-Location-Type is a query about the set of capabilities, the HSS sets a reselection flag and a timer, returns a set of S-CSCF capabilities required by the IMS user. And, the I-CSCF selects a satisfactory S-CSCF in accordance with the set of S-CSCF capabilities required by the IMS user.

After the selection of the S-CSCF, the I-CSCF sends a SIP request to the selected S-CSCF after performing a processing as specified in the 3GPP specification. The S-CSCF processes the registered service and/or the unregistered service of the IMS user or provides a network prompt like "The subscriber you dialed is out of service, please redial later".

If the I-CSCF can not select a satisfactory S-CSCF in accordance with the set of S-CSCF capabilities required by the IMS user, the I-CSCF shall return a response 600 to the called user. Thereafter if the I-CSCF receives a SIP response returned from the S-CSCF, the I-CSCF ignores the SIP response.

On receiving the SIP request sent from the I-CSCF, the S-CSCF checks the registration state of the IMS user. If it is found that the user has not been registered, the S-CSCF notifies the HSS of the registration state of the IMS user and the URI of the S-CSCF through a command Cx-Put and obtains user subscription data through a command Cx-Pull. On receiving the commands Cx-Put and Cx-Pull sent from the S-CSCF, the HSS deletes the reselection flag and checks the S-CSCF URI. If the S-CSCF URI is different from the original S-CSCF URI, the HSS instructs the original S-CSCF to deregister the IMS user through a command Cx-Deregister and deletes the user subscription data. On receiving the command Cx-Deregister sent from the HSS, the original S-CSCF deregisters the IMS user and releases all sessions of the IMS user. If the S-CSCF received previously the SIP request sent from the I-CSCF, the S-CSCF sends a request BYE to the I-CSCF. The I-CSCF does not forward the request BYE on receiving the request BYE.

A call procedure of the invention is described below with reference to the drawings, as illustrated in FIG. 2.

In step 1, the I-CSCF receives an initial request (INVITE).

In step 2, the I-CSCF inquires the HSS about the registration location of the IMS user through a command Cx-Location-Query.

In step 3, the HSS returns a query result (e.g. an S-CSCF) to the I-CSCF.

In step 4, the I-CSCF sends a SIP request to the S-CSCF#1 returned from the HSS.

In step 5, the I-CSCF receives no response from the S-CSCF#1.

In step 6, the S-CSCF#1 notifies the HSS of an S-CSCF URI through a command Cx-Put.

In step 7, the HSS returns an execution result of the command Cx-Put to the S-CSCF#1.

In step 8, the S-CSCF#1 retrieves user data from the HSS through a command Cx-Pull.

In step 9, the HSS returns an execution result of the command Cx-Pull to the S-CSCF#1.

In step 10, the I-CSCF inquires the HSS about a set of S-CSCF capabilities required by the IMS user through a command Cx-Location-Query.

In step 11, the HSS returns an execution result of Cx-Location-Query to the I-CSCF.

In step 12, the I-CSCF selects another satisfactory S-CSCF in accordance with the set of S-CSCF capabilities required by the IMS user and sends a SIP request to the selected S-CSCF#2.

In step 13, the S-CSCF#2 returns a response 100 Trying to the I-CSCF.

In step 14, the S-CSCF#1 returns a response, and the I-CSCF shall not forward the response.

In step 15, the S-CSCF#2 notifies the HSS of an S-CSCF URI through a command Cx-Put.

In step 16, the HSS returns an execution result of the command Cx-Put to the S-CSCF#2.

In step 17, the S-CSCF#2 retrieves user data from the HSS through a command Cx-Pull.

In step 18, the HSS returns an execution result of the command Cx-Pull to the S-CSCF#2.

In step 19, the HSS instructs the S-CSCF#1 to deregister the IMS user through a command Cx-Deregister.

In step 20, the S-CSCF#1 returns an execution result of the command Cx-Deregister to the S-CSCF#1.

In step 21, the S-CSCF#2 returns a response 183 Session Progress to the I-CSCF.

In step 22, the I-CSCF forwards the response 183 Session Progress.

In step 23, the S-CSCF#1 initiates a request BYE, and the I-CSCF shall not forward the request.

The reselection of an S-CSCF is described in further detail in the invention.

The following two methods may be used to reselect an S-CSCF.

1. The First Method

If the HSS to which the called is homed perceives that the called user subscribes to an unregistered service, and the I-CSCF in the home domain of the called perceives that the S-CSCF currently serving the user fails, the I-CSCF requests of the HSS explicitly the information on a set of S-CSCF capabilities to perform the reselection of an S-CSCF and starts a timer to monitor the reselection when beginning to perform the reselection. The HSS determines whether to allow the user to perform the reselection in accordance with a reselection determination condition (for example, the Cx interface of the S-CSCF fails, and an unregistered service of the user is present). If the reselection is not finished when the timer expires, the I-CSCF instructs the HSS to clear the reselection flag or the HSS deletes the reselection flag on its own initiative; otherwise, the reselection flag is cleared by a reselected S-CSCF through a command Server Allocation Request (SAR). All subsequent calls of the user will be routed to the newly-reselected S-CSCF. Because the reselected S-CSCF can not obtain P-CSCF routing information of the user, in this case the reselected S-CSCF can provide the calling user only with the unregistered service to which the called subscribes. Subsequently, the P-CSCF routing information of the user can be recovered when the user acts as a caller again or after the user initiates a registration, and the user can act as a called normally. Specific processes are as follows.

1) In the procedure of the called processing, the I-CSCF in the home domain of the called perceives that the S-CSCF server currently serving the user, which is returned from the HSS, is in a failed state during a routing process (through a Location Information Request (LIR) message).

The failed state of the S-CSCF server may be determined dependent on whether the S-CSCF returns a temporary response 100, other handshake mechanisms, etc.

2) The I-CSCF resends to the HSS a message LIR explicitly requesting information on a set of S-CSCF capabilities.

The explicit request for the information on a set of S-CSCF capabilities may be implemented by extending the existing command LIR in a way of including, but not limited to, adding a new information element in the existing command LIR. A value range of the newly added information element includes: an explicit request for the information on a set of capabilities, and an instruction of deleting the S-CSCF reselection flag of the user. If the newly added information element is not included in the request, the HSS considers that the LIR request is a query about user location information. The HSS determines whether the request belongs to an explicit request for the information on a set of S-CSCF capabilities dependent on whether the request includes the newly added information element and the value of the newly added information element.

3) On receiving the request, the HSS discovers the explicit request for the information on a set of capabilities and checks whether the I-CSCF is allowed to perform the reselection. If the HSS considers that the current S-CSCF malfunctions temporarily just due to a temporary link disconnection or other nonfatal abnormalities, the HSS considers that the function of the current S-CSCF can recover on its own initiative and that it is unnecessary for the I-CSCF to perform the reselection, and returns an error code in a response message to the explicit request for a set of capabilities to indicate to the I-CSCF that the reselection is unnecessary; otherwise the HSS returns the information on a set of S-CSCF capabilities and allows the I-CSCF to perform the reselection.

4) If the I-CSCF is allowed to perform the reselection in the above process 3, the HSS shall further check the user state and the unregistered service. The HSS returns information on a set of S-CSCF capabilities which can satisfy the subscription relationship and sets a flag bit indicating that the user is reselecting an S-CSCF, only if the check is passed.

In particular, different defined application scenarios shall be distinguished for the check of the user state and the unregistered service.

Defined scenario 1: The reselection of an S-CSCF can be performed only if no public user identifier in a Registered state is present throughout the IMS subscription. In this case, the check of the state user by the HSS is as follows.

I. An error is returned if it is determined that the public user identifier included in the current LIR request is in a Registered state.

II. If it is determined that the public user identifier included in the current LIR request is in an Unregistered or Not Register state, it is further determined whether a public user identifier in a Registered state is present in the same IMS subscription. If a public user identifier in a Registered state is present in the same IMS subscription, an error is returned; otherwise it is further determined whether an unregistered service is present for the public user identifier included in the request. If an unregistered service is not present for the public user identifier included in the request, an error is returned. If an unregistered service is present for the public user identifier included in the request, the HSS returns directly information on a set of S-CSCF capabilities for an Unregistered state, and shall further determine whether a public user identifier in an Unregistered state is present in the same IMS subscription for a Notregistered state. If a public user identifier in an Unregistered state is present in the same IMS subscription, the HSS returns information on a set of S-CSCF capabilities; otherwise the HSS returns an error.

Defined scenario 2: The reselection of an S-CSCF is allowed if a public user identifier in a Registered state is present in an IMS subscription. In this case, the check of the user state by the HSS is as follows.

I. If the public user identifier is in a Registered state, the HSS shall further determine whether the user subscribes to an unregistered service. If the user subscribes to an unregistered service, the HSS returns the information on the set of S-CSCF capabilities. If the user does not subscribe to any unregistered service, the HSS shall return an error.

II. If the public user identifier is in an Unregistered or Notregistered state, the HSS shall further determine whether the user subscribes to an unregistered service. If the user does not subscribe to any unregistered service, the HSS shall return an error. If the user subscribes to an unregistered service, the HSS returns directly information on a set of S-CSCF capabilities for an Unregistered state, and shall further check whether at least one allocated S-CSCF server is present for other public user identifiers belonging to the same subscription relationship for a Nonregistered state. If at least one allocated S-CSCF server is present for other public user identifiers in the same subscription relationship, the HSS returns information on a set of S-CSCF capabilities; otherwise the HSS shall return an error.

In particular, the S-CSCF reselection flag bit is implemented by adding a new flag bit in the user subscription data in the HSS. This flag bit belongs to a subscription relation level, i.e. only one such reselection flag is present in an IMS subscription.

5) On receiving the set of capabilities returned from the HSS, the I-CSCF selects an S-CSCF server different from the failed S-CSCF based on the information on the set of capabilities and forwards the INVITE request directed to the called user.

6) If the reselected S-CSCF is in a normal state (the I-CSCF receives a response message returned from this S-CSCF), the subsequent procedure of the called processing is as in the existing procedure. During the processing through the command SAR, the HSS discovers the setting of the S-CSCF reselection flag of the user and the S-CSCF name included in the request being different from that stored locally, deletes the reselection flag of the user and stores the S-CSCF name in the request.

7) If the above reselected S-CSCF is still in an abnormal state, i.e. the reselected S-CSCF returns no temporary response to the I-CSCF when the timer expires, or if the I-CSCF has not reselected another S-CSCF which can satisfy the capability requirement when the timer expires, the HSS deletes the S-CSCF reselection flag of the user, and the I-CSCF returns to the calling user an error response prompting the inaccessibility of the called user.

In particular:

I. The reselection timer may be implemented at the I-CSCF or at the HSS. If the reselection timer is implemented at the I-CSCF, the I-CSCF resends a command LIR to the HSS when the timer expires, for requesting the HSS to clear the reselection flag.

The request for the HSS to clear the S-CSCF reselection flag of the user is implemented by extending the existing command LIR in a way of including, but not limited to, adding a new information element in the existing Command LIR. A value range of the new information element includes an explicit request for information on a set of capabilities and an instruction of deleting the S-CSCF reselection flag of the user. If the newly added information element is not included in the request, the HSS considers that the LIR request is a query about user location information. The HSS determines whether the request belongs to a request for deleting the S-CSCF reselection flag dependent on whether the request includes the newly added information element and the value of the newly added information element.

II. If the reselection timer is implemented at the HSS, the HSS deletes the S-CSCF reselection flag on its own initiative if receiving no request SAR from the reselected S-CSCF when the timer expires.

If the user sets the S-CSCF reselection flag, it indicates that the reselection of an S-CSCF in the called network is currently being performed. The UE initiates a re-registration process within this period. The HSS deletes unconditionally the S-CSCF reselection flag of the user on receiving a Multimedia Authentication Request (MAR) command for the current registration and stores for the user the S-CSCF name carried in the MAR request.

9) If the user sets the S-CSCF reselection flag, it indicates that the reselection of an S-CSCF in the called network is currently being performed. If the user acts as a called again within this period and the HSS receives again a request LIR explicitly requesting the set of S-CSCF capabilities, the setting of the S-CSCF reselection flag in the previous LIR processing is maintained. If the calling party disconnects the current call on his own initiative during the reselection, the I-CSCF sends a command LIR to instruct the HSS to clear the reselection flag in the following two methods.

I. The I-CSCF sends a command LIR to instruct the HSS to clear the reselection flag after the timer for the current reselection expires.

II. The I-CSCF sends a command LIR to instruct the HSS to clear the reselection flag immediately on receiving a request Cancel from the calling party.

In particular, the HSS may clear the reselection flag in the following two methods.

I. The HSS deletes the reselection flag immediately on receiving the command LIR to instruct deleting of the reselection flag.

II. The HSS maintains a counter locally, which counts from zero and which is increased by one on each receiving a command LIR explicitly requesting the set of capabilities and decreased by one on each receiving a command LIR explicitly requesting deleting the reselection flag. The HSS can clear the reselection flag in the current processing of the command LIR only if the counter becomes zero.

In summary for above, a case of deleting the reselection flag is illustrated in the following table:

| Procedure of deleting reselection flag | The place where reselection timer is implemented | |
|---|---|---|
| | I-CSCF | HSS |
| Clear flag on successful reselection | Reselected S-CSCF deletes reselection flag when downloading user data from HSS (SAR) | Reselected S-CSCF deletes reselection flag when downloading user data from HSS (SAR) |
| Initiate a registration and clear flag through registration during reselection | Reselection of S-CSCF is triggered in called procedure, the user initiates a re-registration process at this time, MAR arrives at HSS earlier than SAR and flag is cleared in processing of MAR | Reselection of S-CSCF is triggered in called procedure, the user initiates a re-registration process at this time, MAR arrives at HSS earlier than SAR and flag is cleared in processing of MAR |
| Clear flag when reselection timer expires | I-CSCF sends a command LIR to instruct HSS to clear S-CSCF reselection flag of the user on discovering that the reselection timer expires | HSS deletes on its now initiative S-CSCF reselection flag of the user on discovering that the reselection timer expires |
| Calling party disconnects the call | HSS does not store reselection counter | |
| | I-CSCF discovers that the calling parity disconnects the call, and awaits the time out of timer or sends immediately a command LIR to instruct HSS to clear the reselection flag (the newly added information element takes the same value) | I-CSCF discovers that the calling parity disconnects the call, and awaits the time out of timer or sends immediately a command LIR to instruct HSS to clear the reselection flag (the newly added information element takes the same value) |
| | HSS stores the reselection counter | |
| | I-CSCF discovers that the calling parity disconnects the call, sends a command LIR to instruct HSS to clear the reselection flag; and HSS decreases the counter by one on receiving the command LIR, and deletes the reselection flag if the counter takes the value of zero | I-CSCF discovers that the calling parity disconnects the call, sends a command LIR to instruct HSS to clear the reselection flag; and HSS decreases the counter by one on receiving the command LIR, and deletes the reselection flag if the counter takes the value of zero |

2. The Second Method

In the case of perceiving that a failure may be present at the S-CSCF, the HSS returns the S-CSCF URI and the S-CSCF capabilities and instructs the I-CSCF to perform the reselection of an S-CSCF in some cases in accordance with a preset condition, as the following steps.

1) The HSS discovers in processing of the LIR that the S-CSCF fails (for example, because a reference point between the HSS and the S-CSCF adopts the protocol Diameter and underlying layer transmission of this protocol is based on a reliable transmission protocol, the HSS can determine during the request LIR whether the link connection between the HSS and the S-CSCF is normal in accordance with the S-CSCF name stored in the user data and considers that the S-CSCF fails if the HSS discovers that the S-CSCF link fails), returns in an LIA the stored SIP URI of the S-CSCF and the information on the set of S-CSCF capabilities, and sets the S-CSCF reselection flag of the user.

In particular, if the I-CSCF does not support the reselection feature of an S-CSCF, the I-CSCF does not carry an information element SupportFeature in the sent request LIR or carries this information element but does not indicate the support of reselection of an S-CSCF, the HSS returns only the S-CSCF SIP URI but no information on the set of capabilities in the response LIA.

2) The I-CSCF determines the failure of the S-CSCF and performs the reselection of an S-CSCF in accordance with the information on the set of S-CSCF capabilities and forwards the request INVITE.

In particular, the failure state of the S-CSCF may be determined as follows: the I-CSCF may firstly contact the S-CSCF in the message on receiving the response LIA and considers that the S-CSCF fails indeed if no response is received from the S-CSCF within a period of time.

3) Subsequent processing is the same as in the first method and is not repeated.

In particular, the command LIR is still required to be extended, but the value of the newly added information element does not include the value of any explicit request for the set of capabilities, and the value of the request for instructing the HSS to clear the reselection flag in the case of time out of the timer is still retained.

It is noted that the reselection timer may be implemented in the HSS.

Because the HSS and the I-CSCF may be of different versions and either the HSS or the I-CSCF may not support the S-CSCF reselection function of S-CSCF, the interoperation issue between the different versions shall be taken into account in the following two solutions.

Solution 1 is by means of a message LIA. This solution is applicable only to the above first method and includes the following processes.

1) The reselection of an S-CSCF is triggered by the I-CSCF. If the I-CSCF does not support and the HSS supports the feature, the I-CSCF will not initiate an explicit request for the information on the set of capabilities so as to trigger the reselection of an S-CSCF, thereby there will be no interoperation issue.

2) In another case, if the I-CSCF supports and the HSS does not support the feature, the I-CSCF requests explicitly the information on the set of capabilities through the extended command LIR on discovering the failure of the S-CSCF. The HSS can not identify the newly added information element in the command since the HSS does not support the feature, the subsequent processing is as in the existing procedure, i.e. the HSS returns the current S-CSCF SIP URI address instead of the information on the set of capabilities to the I-CSCF. The I-CSCF can determine that the HSS does not support the feature on receiving the response, and returns directly a failure response to the calling party without performing the reselection of an S-CSCF.

Solution 2 is by means of feature negotiation. This scheme is applicable to the above first method and second method, and includes the following processes.

1) For the First Method

The I-CSCF supporting the reselection of an S-CSCF carries an information element SupportFeature in the first command LIR for inquiring about user location information and indicates in the information element that the I-CSCF supports the S-CSCF reselection feature, and the HSS also carries an information element SupportFeature in the response LIA and lists its supported features in the information element SupportFeature. On receiving the response, the I-CSCF further determines whether the HSS also supports the reselection, and further requests explicitly the information on a set of capabilities if the HSS supports the reselection. If it is indicated in the response that the HSS does not support the reselection or that such an information element is not present in the response, the I-CSCF returns directly a failure response to the calling party without performing the reselection of any S-CSCF.

2) For the Second Method

The I-CSCF carries an information element SupportFeature in the first command LIR for inquiring about user location information and indicates in the information element whether the I-CSCF supports the S-CSCF reselection feature. If the HSS supports the reselection but it is discovered that the information element in the request indicates that the I-CSCF does not support the reselection feature or that the information element is not present, the HSS does not return in the response LIA the information on a set of capabilities. If the HSS does not support the reselection, the HSS ignores the information element and returns in the response LIA only the current S-CSCF SIP URI of the user.

Description is presented below by way of two embodiments.

The Third Embodiment

Figure 5:
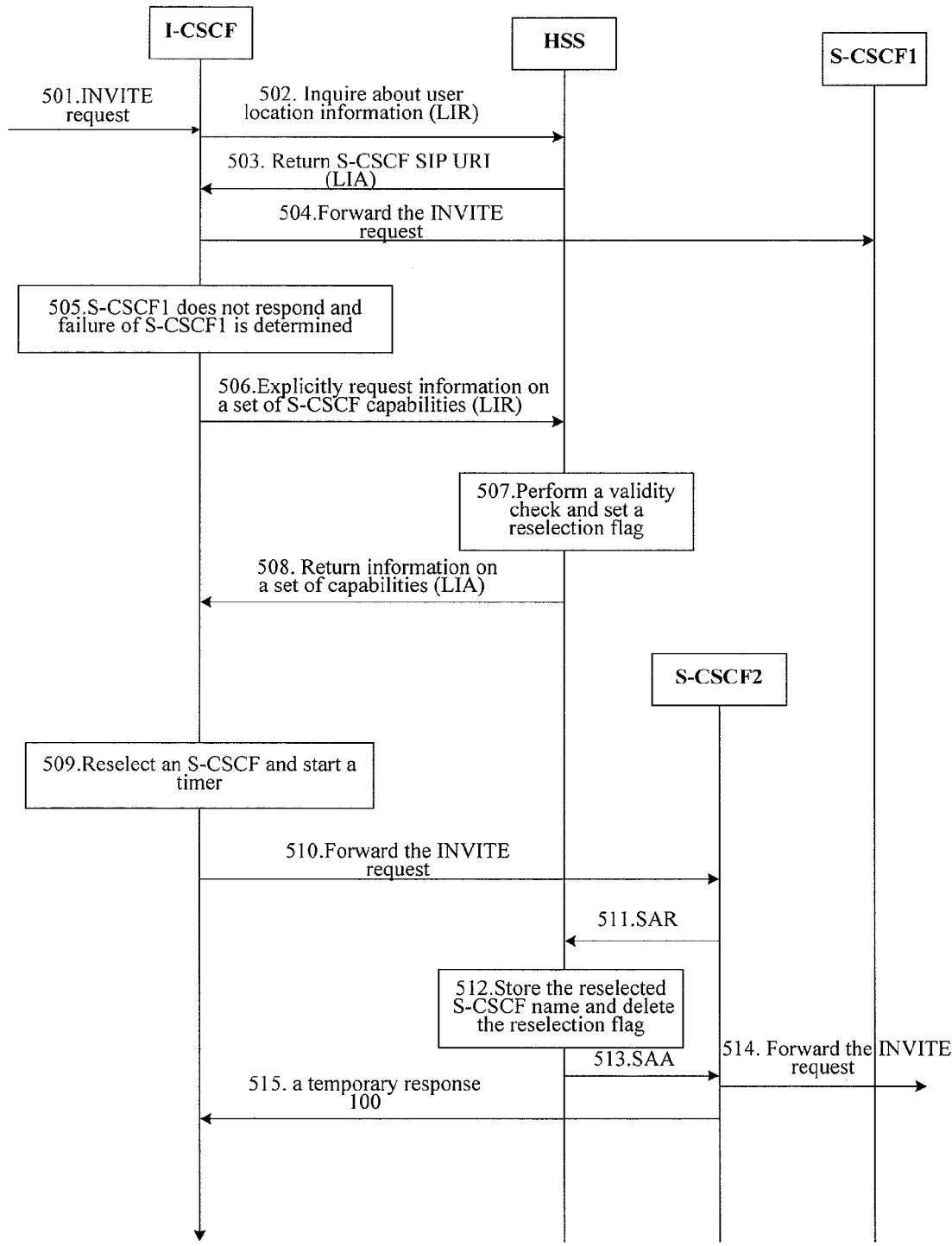
FIG. 5 is a flow diagram of initiating a session request to an unregistered user according to a third embodiment of the invention.

As illustrated in FIG. 5, the reselection of an S-CSCF is performed when the user acts as a called, the reselected S-CSCF functions normally, and the user does not initiate any registration process during the reselection. The I-CSCF in the home domain of the called proceeds as follows on receiving a request INVITE to the called.

501-505: The I-CSCF forwards the request INVITE to the S-CSCF returned from the HSS (S-CSCF1 as shown in FIG. 5) but the S-CSCF1 does not respond, and then it is determined that the S-CSCF1 fails.

506: The I-CSCF requests of the HSS the information on a set of S-CSCF capabilities explicitly.

507-510: A check by the HSS is passed. The I-CSCF reselects an S-CSCF in accordance with the returned information on the set of capabilities, starts a timer and forwards the request INVITE to the reselected S-CSCF (i.e. S-CSCF2).

511-513: The reselected S-CSCF2 requests the HSS to download user data. The HSS on receiving the request discovers that the S-CSCF name included in the request is different from that stored locally and further determines whether a reselection flag of the user is set (the HSS allows the S-CSCF name stored in the user data to be modified through a command SAR only if the reselection flag is set). If the reselection flag is set, the HSS deletes the S-CSCF reselection flag, stores for the user the new S-CSCF name carried in the request and returns the user data; otherwise the HSS considers that this belongs to an abnormal case, disallows the S-CSCF name stored in the HSS to be modified and returns an error to the S-CSCF.

514: The reselected S-CSCF further controls the processing of the current service.

515: The reselected S-CSCF returns a temporary response 100 to the I-CSCF on a successful downloading of the user data. The I-CSCF terminates the timing of the timer, which indicates a successful reselection for this time. If no response message is received from the S-CSCF after the reselection timer expires, the I-CSCF sends to the HSS a message LIR instructing deleting of the reselection flag.

In another method, the reselection timer may be arranged in the HSS and starts timing when the HSS returns the set of capabilities to the I-CSCF. If the HSS receives no message SAR within a prescribed period of time, the HSS deletes the reselection flag on its own initiative.

The Fourth Embodiment

Figure 6:
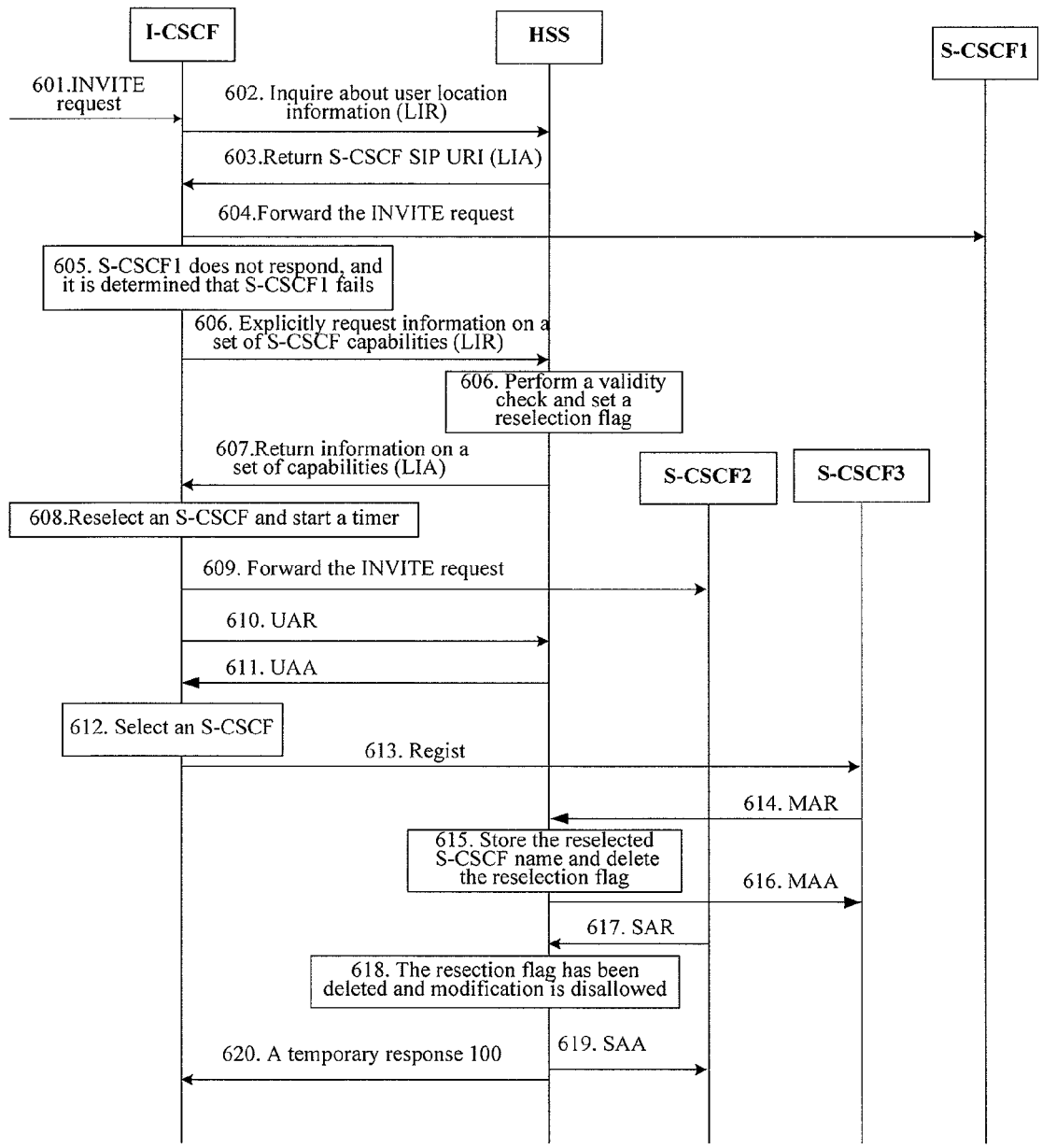
FIG. 6 is a flow diagram of initiating a session request to an unregistered user according to a fourth embodiment of the invention.

As illustrated in FIG. 6, the reselection of an S-CSCF is performed when the user acts as a called, but the user initiates another registration process during the reselection and an S-CSCF reselected during the registration is different from that in the called procedure. A specific procedure is as follows.

601: The I-CSCF in the home domain of the called receives a request INVITE directed to the called.

602-605: The I-CSCF forwards the request INVITE to the S-CSCF returned from the HSS (i.e. S-CSCF1) but the S-CSCF1 does not respond, and then it is determined that the S-CSCF1 fails.

606: The I-CSCF requests explicitly of the HSS the information on a set of S-CSCF capabilities.

607-609: A check by the HSS is passed. The I-CSCF reselects an S-CSCF in accordance with the returned information on the set of capabilities and forwards the request INVITE to the reselected S-CSCF2.

610-613: The user initiates another registration at this time. Because the S-CSCF returned from the HSS in the first User Authorization Request (UAR) fails, the I-CSCF initiates the second UAR request for requesting explicitly the HSS for the information on a set of S-CSCF capabilities, and reselects a satisfactory server S-CSCF3 in accordance with the information on the set of capabilities.

614-616: If a Multimedia Authentication Request (MAR) of the S-CSCF3 arrives at the HSS prior to an SAR of the S-CSCF2 due to various reasons, the HSS on receiving the MAR request deletes a reselection flag of the user unconditionally if the HSS discovers that the reselection flag is set, stores for the user the S-CSCF name in the MAR request, and returns a Multimedia Authentication Answer (MAA).

617-619: When the SAR request of the reselected S-CSCF2 arrives at the HSS, the HSS discovers that the reselection flag of the user is not set, then proceeds with the existing processing, disallows the local S-CSCF name to be modified, and returns an error to the S-CSCF2.

620: The S-CSCF2 returns a response 100 to the I-CSCF on receiving the error response.

On receiving the response from the S-CSCF2, the I-CSCF considers that a functionally normal S-CSCF has been reselected and will not send any message instructing the HSS to clear the S-CSCF reselection flag.

Subsequent service requests of the user will be routed to the S-CSCF3 for service control.

It can be seen from the above description of the solutions that the invention introduces the following new concepts.

1. The S-CSCF reselection flag is newly introduced in user data.

Only one S-CSCF reselection flag is present in an IMS subscription, and the reselection flag is set when the I-CSCF requests explicitly of the HSS the set of capabilities or when the HSS returns the set of capabilities and the SIP URI to the I-CSCF. The reselection flag may be cleared in the following three methods.

1) The reselection flag is cleared through a command SAR: when the reselected S-CSCF downloads user data from the HSS through a command SAR, the HSS checks whether the reselection flag of the user is set. If the reselection flag is set, the HSS stores for the user the name of the new reselected S-CSCF, deletes the reselection flag, and returns the user data. If no reselection flag is set, the HSS proceeds with the existing procedure, i.e. the HSS returns an error to the S-CSCF.

2) The reselection flag is cleared through a command MAR: if the S-CSCF reselection flag of the user has been set in the HSS, it indicates that the reselection of an S-CSCF is being performed for the user acting as a called, and the UE initiates a re-registration. Because the S-CSCF stored currently by the HSS is in a failed state, the reselection of an S-CSCF is also performed during the re-registration and a command MAR of the S-CSCF reselected during the re-registration is prior to a command SAR of the S-CSCF reselected for the called. Therefore, the HSS deletes the reselection flag unconditionally and stores the S-CSCF name in the MAR for the user if the HSS discovers that the S-CSCF reselection flag of the user is set on receiving the command MAR. On receiving subsequently a command SAR of the S-CSCF reselected for the called, the HSS disallows the S-CSCF name of the user to be modified and returns an error to the S-CSCF reselected for the called because the reselection flag has been cleared.

3) The reselection flag is cleared through a timer: the HSS deletes the reselection flag if the HSS receives no command SAR when the S-CSCF reselection timer of the user expires.

2. The reselection timer is introduced, which may be implemented at either the I-CSCF or the HSS.

1) If the reselection timer is implemented at the I-CSCF, the existing timerF timer in the SIP protocol may be reused, or a new timer may be introduced. When performing the reselection of an S-CSCF after receiving the set of capabilities returned from the HSS, the I-CSCF starts the timer and forwards the request INVITE. If the I-CSCF receives no response from the S-CSCF or has not selected a satisfactory S-CSCF after the timer expires, the I-CSCF shall send to the HSS a request LIR instructing the HSS to clear the S-CSCF reselection flag of the user.

2) If the reselection timer is implemented at the HSS, the HSS starts the newly introduced timer when returning the information on the set of capabilities to the I-CSCF, and terminates the timing and deletes the reselection flag on receiving the command SAR of the reselected S-CSCF or on receiving the MAR. If the HSS receives no command SAR when the timer expires, the HSS deletes the reselection flag of the user on its own initiative.

With the method of supporting the reselection of an S-CSCF in the called procedure, the invention addresses the issue in the prior art that no unregistered service can be provided for the user and particularly no PSI can be implemented due to an S-CSCF failure, and thereby greatly reducing the risk existing in network operation, improving the reliability of the IMS network and enhancing the user satisfaction.

Therefore, in accordance with the invention, if an S-CSCF returned from the HSS, which processes an unregistered service of an IMS user, returns no response due to a device failure, a communication interruption, etc., the I-CSCF reselects another S-CSCF for processing the unregistered service of the IMS user in accordance with a set of S-CSCF capabilities required by the IMS user. If the reselected S-CSCF processes the unregistered service of the IMS user successfully, a failure of a SIP request from the calling side due to a time out can be avoided and the unregistered service of the called IMS user can be executed properly, thereby avoiding the serious possible disadvantage that the proper service can not be provided for the IMS user for a long time.

Although the invention has been described with reference to the embodiments, those ordinarily skilled in the art shall appreciate that numerous modifications and variations are possible to the invention without departing from the spirit of the invention, and the scope of the invention shall be defined as the appended claims.

What is claimed is:

1. A session processing method in an Internet Protocol multimedia subsystem, wherein the method comprises:
receiving an initial request for a called user by an Interrogating-Call Session Control Function (I-CSCF);

inquiring, by the I-CSCF, a Home Subscriber Server (HSS) about a registration location of the called user;

receiving, by the I-CSCF, a response from the HSS;

sending, by the I-CSCF, a Session Initiation Protocol (SIP) request to a Serving-Call Session Control Function (S-CSCF) according to the response from the HSS;

determining, by the I-CSCF, whether a response from the S-CSCF has been received within a prescribed period of time; and reselecting an S-CSCF if receiving no response from the S-CSCF within the prescribed period of time, and sending a SIP request to the reselected S-CSCF, by the I-CSCF, wherein the process of reselecting an S-CSCF comprises: obtaining a set of S-CSCF capabilities required by the called user from the HSS by sending to the HSS a location information request, wherein the location information request comprises at least one of a command Cx-Location-Query, which is extended by newly adding an information element in the command Cx-Location-Query, and a command Cx-Select-Pull, where an IMS Private Identity (IMPI) attribute type of the command Cx-Select-Pull is modified as being conditional, reselecting an S-CSCF in accordance with the set of S-CSCF capabilities.

2. The session processing method in the Internet Protocol multimedia subsystem according to claim 1, wherein the I-CSCF acts as a stateful proxy.

3. The session processing method in the Internet Protocol multimedia subsystem according to claim 1, wherein the command Cx-Location-Query, which is extended by newly adding an information element in the command Cx-Location-Query, comprises adding a user location query type parameter in the command Cx-Location-Query.

4. The session processing method in the Internet Protocol multimedia subsystem according to claim 3, wherein the user location query type parameter in the command Cx-Location-Query comprises User-Location-Type Attribute Value Pair (AVP).

5. The session processing method in the Internet Protocol multimedia subsystem according to claim 1, wherein the process of obtaining the set of S-CSCF capabilities required by the called user from the HSS comprises:

receiving the response from the HSS comprising the set of S-CSCF capabilities by the I-CSCF, obtaining the set of S-CSCF capabilities from the response from the HSS.

6. The session processing method in the Internet Protocol multimedia subsystem according to claim 1, before the process of reselecting the S-CSCF the method further comprising:

acting, by the I-CSCF, as a stateful proxy if the response from the HSS comprises an indication that part of identity identifiers are in an unregistered state and none of the identity identifiers is in a registered state or an indication of awaiting processing of an unregistered service.

7. The session processing method in the Internet Protocol multimedia subsystem according to claim 6, wherein the indication that part of identity identifiers are in an unregistered state and none of the identity identifiers is in a registered state comprises DIAMETER_SOME_ID_UNREGISTERED; the indication of awaiting processing of an unregistered service comprises DIAMETER_UNREGISTERED_SERVICE.

8. The session processing method in the Internet Protocol multimedia subsystem according to claim 1, wherein the process of reselecting the S-CSCF comprises:

discovering, by the I-CSCF, that the S-CSCF currently serving the called user is in an unavailable state, and reselecting, by the I-CSCF, an S-CSCF other than the S-CSCF in the unavailable state.

9. The session processing method in an Internet Protocol multimedia subsystem according to claim 8, wherein the process of reselecting, by the I-CSCF, the S-CSCF other than the S-CSCF in the unavailable state comprises:

obtaining, by the I-CSCF, the set of S-CSCF capabilities required by the called user; and reselecting, by the I-CSCF, the S-CSCF other than the S-CSCF in the unavailable state in accordance with the set of S-CSCF capabilities.

10. The session processing method in the Internet Protocol multimedia subsystem according to claim 9, wherein the process of obtaining, by the I-CSCF, the set of S-CSCF capabilities required by the called user comprises: on perceiving that the S-CSCF currently serving the called user is in an unavailable state, sending, by the I-CSCF, the location information request to the HSS for information on the set of S-CSCF capabilities; and receiving, by the I-CSCF, the information on the set of S-CSCF capabilities from the HSS in response to the location information request.

11. The session processing method in the Internet Protocol multimedia subsystem according to claim 10, wherein the HSS considers that the location information request is a query about user location information if the location information request does not comprise the newly added information element; and the HSS determines whether the location information request belongs to a request for the information on the set of S-CSCF capabilities after determining whether the location information request comprises the newly added information element and a value of the newly added information element.

12. The session processing method in the Internet Protocol multimedia subsystem according to claim 11, wherein the command Cx-Location-Query, which is extended by newly adding an information element in the command Cx-Location-Query, comprises adding a location query type parameter in the command Cx-Location-Query.

13. The session processing method in the Internet Protocol multimedia subsystem according to claim 12, wherein the location query type parameter in the command Cx-Location-Query comprises User-Location-Type Attribute Value Pair (AVP).

14. The session processing method in the Internet Protocol multimedia subsystem according to claim 11, wherein the I-CSCF supporting the process of reselecting of an S-CSCF carries the information element SupportFeature in a first user location information request and indicates in the information element SupportFeature that the I-CSCF supports the process of reselecting; the HSS also carries an information element SupportFeature in the response and lists therein its supported features; the I-CSCF further determines whether the HSS also supports the process of reselecting on receiving the response; if yes, the I-CSCF further requests explicitly for the information on the set of S-CSCF capabilities; if it is indicated in the response that the HSS does not support the process of reselecting or the information element SupportFeature is not present in the response, the I-CSCF returns a failure response to a calling party without performing the process of reselecting-of any S-CSCF.

15. The session processing method in the Internet Protocol multimedia subsystem according to claim 10, wherein the HSS checks whether to allow the I-CSCF to perform the process of reselecting on receiving the location information request for information on the set of S-CSCF capabilities from the I-CSCF in a manner that if the HSS considers that the S-CSCF currently serving the called user can resume on its own initiative so that it is unnecessary for the I-CSCF to perform the process of reselecting, the HSS returns an error code in a response message to the location information request for information on the set of S-CSCF capabilities to notify the I-CSCF of unnecessary process of reselecting; otherwise the HSS allows the I-CSCF to perform the process of reselecting and returns the information on the set of S-CSCF capabilities.

16. The session processing method in the Internet Protocol multimedia subsystem according to claim 10, wherein the I-CSCF supporting the process of reselecting of an S-CSCF carries the information element SupportFeature in a first user location information request and indicates in the information element SupportFeature that the I-CSCF supports the process of reselecting; the HSS also carries an information element SupportFeature in the response and lists therein its supported features; the I-CSCF further determines whether the HSS also supports the process of reselecting-on receiving the response; if yes, the I-CSCF further requests explicitly for the information on the set of S-CSCF capabilities; if it is indicated in the response that the HSS does not support the process of reselecting-or the information element is not present in the response, the I-CSCF returns a failure response to a calling party without performing the process of reselecting of any S-CSCF.

17. An Interrogating-Call Session Control Function (I-CSCF) executed on a server executed in an Internet Protocol multimedia subsystem, wherein the I-CSCF is configured to receive an initial request for a called user, inquire a Home Subscriber Server (HSS) about a registration location of the called user,
receive a response from the HSS;
send a Session Initiation Protocol (SIP) request to a Serving-Call Session Control Function (S-CSCF) according to the response from the HSS;
obtain a set of S-CSCF capabilities required by the called user from the HSS by sending to the HSS a location information request, wherein the location information request comprises at least one of a command Cx-Location-Query, which is extended by newly adding an information element in the command Cx-Location-Query, and a command Cx-Select-Pull, where an IMS Private Identity (IMPI) attribute type of the command Cx-Select-Pull is modified as being conditional;
determine whether a response from the S-CSCF has been received within a prescribed period of time; and
reselect an S-CSCF in accordance with the set of S-CSCF capabilities if receiving no response from the S-CSCF within the prescribed period of time, and send a SIP request to the reselected S-CSCF.

18. The I-CSCF executed on a server executed in the Internet Protocol multimedia subsystem according to claim 17, wherein the command Cx-Location-Query, which is extended by newly adding an information element in the command Cx-Location-Query, comprises adding a user location query type parameter in a command Cx-Location-Query.

19. The I-CSCF in the Internet Protocol multimedia subsystem according to claim 18, wherein the user location query type parameter in the command Cx-Location-Query comprises User-Location-Type Attribute Value Pair (AVP).

* * * * *